(12) United States Patent
Martina et al.

(10) Patent No.: US 6,367,336 B1
(45) Date of Patent: Apr. 9, 2002

(54) PROCESS MASS FLOW APPARATUS AND METHOD FOR MEASURING THE MASS FLOW OF POWDERED AND GRANULATED SOLIDS AS WELL AS THE ACCUMULATED WEIGHT OF MATERIAL PASSED DURING A SPECIFIED TIME

(76) Inventors: Hugo Gabriel Martina, Avda. de la Quebrada S/N, Barrio Parque Corcovado, Villa Rumipal, Cordoba; Guillermo Alfredo Martina, Cid Campeador 537; Drewfus Young Myers, Jr., Avda. Fuerza Aerea 418, both of 5850 Rio Tercero, Cordoba, all of (AR)

( * ) Notice: Subject to any disclaimer, the term of this patent is extended or adjusted under 35 U.S.C. 154(b) by 0 days.

(21) Appl. No.: 09/476,008

(22) Filed: Dec. 29, 1999

(30) Foreign Application Priority Data

Dec. 29, 1998 (AR) .......................................... 980106724

(51) Int. Cl.⁷ ............................. G01F 1/28; G01F 21/00
(52) U.S. Cl. ................................. 73/861.74; 73/861.75; 73/1.16
(58) Field of Search ...................... 73/861.71, 861.73, 73/861.74, 861.75, 861.76, 1.16

(56) References Cited

U.S. PATENT DOCUMENTS

| | | | | |
|---|---|---|---|---|
| 2,632,329 A | * | 3/1953 | Zuehlke | 73/861.74 |
| 3,774,446 A | * | 11/1973 | Diehl | 73/861 |
| 4,277,022 A | * | 7/1981 | Holdsworth et al. | 239/7 |
| 4,344,747 A | * | 8/1982 | Henry | 425/140 |
| 4,614,122 A | * | 9/1986 | Graves | 73/861.74 |
| 4,945,344 A | * | 7/1990 | Farrell et al. | 73/861.74 |
| 5,186,049 A | * | 2/1993 | Shannon | 73/861.74 |
| 5,282,389 A | * | 2/1994 | Faivre et al. | 73/861.74 |
| 5,343,761 A | * | 9/1994 | Myers | 73/861.73 |
| 5,798,466 A | * | 8/1998 | Satake et al. | 73/861.73 |
| 6,003,387 A | * | 12/1999 | Larson et al. | 73/861.74 |

* cited by examiner

Primary Examiner—Harshad Patel
(74) Attorney, Agent, or Firm—Bachman & LaPointe, P.C.

(57) ABSTRACT

A process mass flow apparatus for measuring the mass flow rate of a powdered, granulated or otherwise substantially divided process solid, seeds, grains, or similar particulate materials includes a process material inlet, a process material outlet, a measuring chamber connecting the process material inlet and the process material outlet, comprising a movable element with a fixed axis of rotation located in the flow path of the process material and having attached to the axis of rotation a material flow sensor which provides a raw output signal corresponding to an unknown mass flow rate and a processor which contains an empirically derived calibration function for converting the raw output signal to an adjusted signal indicating the mass flow rate of the process fluid. A method is also disclosed for determining an unknown mass flow using an empirically derived conversion function, the function being derived by correlating the output signals of a mass flow instrument sensing the flow of a calibration material with the output signals of the mass flow instrument sensing the flow of the process material, as is a method for calculating the accumulated weight of material having passed through the measuring chamber during a period of time specified by the user.

6 Claims, 6 Drawing Sheets

$$F \times D = F_R \times d$$

PROCESS MASS FLOW APPARATUS AND METHOD FOR MEASURING THE MASS FLOW OF POWDERED AND GRANULATED SOLIDS AS WELL AS THE ACCUMULATED WEIGHT OF MATERIAL PASSED DURING A SPECIFIED TIME

BACKGROUND OF THE INVENTION

The present invention relates to a flow meter and more particularly to a process gravity free fall flow meter for measuring the flow rate and accumulated weight of solid powdered, particulate or granulated materials or other solids of like nature such as seeds, grains and pellets passing through a measuring chamber.

The current state of the art in the area of the continuous measurement of flow rates and accumulated weights of solid particulate materials is limited primarily to four systems: Coriolis force flow meters, impact flow meters, flow meters based on electronic load cells, and turbine flow meters.

Of the four major classes of flow meters suitable for solid particulate materials, each can be found to have its limitations, the major examples of which can be related to the physical phenomena and forces involved in the principles of their functioning and in the complexity of mechanisms necessary for adequately controlling and compensating for the related problems and deficiencies.

As is well known to those practiced in the art, a Coriolis flow meter is a mass flow meter that measures the mass flow rate of material flowing in a flow tube supported at both ends by oscillating the flow tube and detecting a Coriolis force acting on the flow tube, said measured force being theoretically proportional to the mass flow rate of the material. The Coriolis force is detected as a difference of phases produced at symmetrical positions between the supporting points and the center portion of,the flow tube when the flow tube is driven alternately at its center portion in a direction perpendicular to the supporting axis.

In operation, the flow tube is electromechanically vibrated out-of-phase with respect to a balance tube which is provided to reduce the vibrations that would be associated with a single unbalanced flow tube. These vibrations impart a Coriolis acceleration to material flowing through the flow tube. The reaction force to this Coriolis acceleration results in a slight distortion of the vibration mode shape of the flow tube. This distortion is measured by sensors connected to, or associated with, the flow tube. The sensors may be either of the velocity or displacement type. The material flow rate is proportional to the time or phase delay between the signals generated by two such sensors positioned along the length of the straight flow tube. A single sensor may also be used. Output signals of the sensors are applied to electronic apparatus which derives the desired information, such as mass flow rate, for the material in the flow tube.

Among the problems encountered in the application of the Coriolis force for the accurate measurement of the flow rate of a material are those related to correcting errors caused by a differences in or changes in the density of the flowing material, differences in the temperature deformation of the materials comprising the flow tube, and differences in temperature in the flow tube and the resonant member. Other difficulties related to the practical functioning of Coriolis force flow meters will be apparent to those practiced in the art. The measures required to circumvent and overcome the various limitations of the Coriolis force-based systems tend to greatly increase the complexity, and therefore the cost, of such systems.

The impact flow meter is widely employed in industry due to its potential robustness and ease of insertion into flow systems. The systems are based on the measurement of one component (usually horizontal) of the force of impact imparted by the flowing material as it falls on an impact plate positioned in the general line of flow of the material of interest. The impact of the flowing material on the impact plate produces a minimal movement or distortion in the position of the plate. A sensor, force transducer or other mechanism transfers the limited movement or distortion of the impact plate to the appropriate sensing device and related electronic circuitry which then converts that signal to an instantaneous mass flow rate based on suitable calibration data.

While the theory of the impact mechanism is clear, in practice, there are several problems that can significantly affect the accuracy of the force measurement and, therefore, the calculated flow rate. Simple physics shows that the force imparted to the impact plate by falling material will be a direct function of the relative angle of impact on the plate. Any change in that impact angle produced by an improper installation of the device in the flow path or subsequent movement after installation will introduce significant errors in the calculation of the final flow rate. In addition, because the movement of the impact plate is very limited, the mechanism employed to sense and transmit the resultant impact force to the corresponding electronic circuits must by necessity be very sensitive. That sensitivity necessitates the use of measures to protect the sensing mechanism and/or correct for changes in the response of said device, all of which imply the need for more complexity and cost in the construction and operation of such devices.

In a typical configuration for such units, bulk material is allowed to fall from a defined height upon a deflector plate which has been arranged at an angle to the vertical, with the flexural moment generated in the process being determined within the flexible joint of the deflector plate. The deflector plate arrangements have certain defects which result in relatively severe inaccuracies in measurement in the case of one and the same bulk material and which make problematical use of the same unit for a variety of materials, such as in dosing processes. Because in most such units moments are measured, it is not only the impact force which is generated via changes in pulsing which is decisive, but also the specific location where the bulk material impacts the deflector plate. In this instance, considerable variations are possible, depending upon the nature of the material involved. Furthermore, the type of momentum transmission involved is essential—the degree of force transmitted is greater in the case of elastic impact than with inelastic impact. The specific impact rate, which must be taken into consideration, also varies with the type of bulk material involved and the condition of the bulk material at a given moment. The units described generally provide satisfactory results with respect to the bulk material to be weighed only through extensive calibration and generally require frequent control of such calibration.

Devices based on electronic load cells are also common in industry due to their theoretical precision and adaptability to transport belts and related systems as well as direct static weighing. Electronic load cells devices, however, are found to be extremely sensitive to physical abuse, requiring frequent calibration and control to maintain accuracy and precision. In addition, they are relatively delicate and easily broken by misuse. Their accuracy is also dependent on their proper installation so that any dislocation or movement in their location can produce significant errors in the final result.

Turbine flow meter devices have found great application in the measurement of fluid flows, especially in pressurized gas flow measurements and in simple pumped liquids such as is found in gasoline pumps. In such applications, however, the fluid flow is generally relatively constant and there exists a natural resistance in the flow field that prevents any "free wheeling" of the measuring turbine when the force of the flowing material changes. In free flowing systems such as those contemplated by the present invention, turbine flow meters are rare and those in existence must incorporate some braking mechanism to prevent "free wheeling" of the turbine, since free fall systems will not have the natural braking mechanism present in a pumped fluid system. Such braking mechanisms routinely involve some mechanical and/or electromagnetic phenomenon that requires continual or periodic monitoring of the applied braking force to insure constancy of its action so as not to over compensate and thereby alter the resultant forces and introduce measurement errors, or to detect and compensate for variations in braking force due to wear, fatigue or changes in characteristics due to changes in temperature or other ambient conditions.

As will be seen by the following disclosure, most of the complications and disadvantages of the flow measuring systems currently known to the art can be simplified, overcome or avoided completely by the present invention.

SUMMARY OF THE INVENTION

In view of the foregoing description of the current related art, it is an object of the present invention to provide a process mass flow apparatus for measuring the mass flow rate of a powdered, granulated or otherwise substantially divided process solids, seeds, grains, or similar particulate materials comprising: a process material inlet, a process material outlet, a flow passage or measuring chamber connecting the process material inlet and the process material outlet, a process material flow sensor located in the measuring chamber which provides a raw output signal corresponding to an unknown mass flow rate, and a signal processor, computer, programmed logic controller (plc) or other device of a similar function known to the art which contains an empirically derived conversion function for converting the raw output signal to an adjusted-signal indicating the mass flow rate of the process material. An additional object of the invention is to provide a method for determining an unknown mass flow rate using an empirically derived conversion function, the function being derived by correlating the raw output signal of a mass flow apparatus sensing the flow of a calibration material with the output signal of the mass flow instrument sensing the flow of the process material and a method for calculating the accumulated weight of material having passed through the measuring chamber during a period of time specified by the user. The exemplary mass flow instrument may further include a flow control portion, which may comprise a control unit, a valve drive, a valve, or other control or warning device known in the art that responds to an electronic, visual, audio, or other signal form produced by said control unit as a result of the process of determining the flow rate and/or accumulate weight of process material passing through or having passed through the measuring chamber.

In accordance with another embodiment of the present invention, a method for determining an unknown mass flow rate of a process material flowing through a process mass flow apparatus is provided. The process mass flow instrument provides a raw output signal corresponding to mass flow of the process material through the process mass flow apparatus. The method comprises the acts of providing one or more calibration materials which may or may not be the same as the process material and providing a mass flow apparatus similar to the process mass flow apparatus which is used for calibration purposes. The calibration mass flow apparatus is calibrated using the calibration material or materials by allowing said calibration material or materials to flow through the calibration mass flow apparatus at various known mass flow rates and correlating the raw output signal with the corresponding known flow rate and subsequently deriving a flow rate conversion function by applications of mathematical regression analysis using procedures or computer programs well known in the art. The conversion function may be a linear, quadratic, or cubic polynomial function or other mathematical function suitable for the specific application. Included in the conversion function is a multiplication factor or final calibration factor that allows the user to fine-tune the characteristics between the process mass flow meter and the calibration mass flow meter. After the calibration function is determined it is programmed into the control unit of the process mass flow meter. Once the process mass flow meter is installed in its final position, a final calibration is carried out by passing process material through the mass flow apparatus at a known flow rate. The ratio between the known flow rate of process material and that indicated by the preliminary calibration, hereafter called the final process calibration factor, K, given by the ratio of the known process material flow rate, F2, to the indicated flow rate, F1, (K=F2/F1) is then employed as the final calibration factor which is entered into the control unit program by the user to complete the calibration process.

A typical calibration function for a preferred embodiment of the present invention would be of the form $$Q=K*[(A*S^3)+(B*S^2)+(C*S)+D]$$

where Q is the flow rate of process or calibration material passing through the measuring chamber at the instant of signal conversion, K is the previously defined final process calibration factor, S is the value of the raw signal produced by the material flow passing through the measuring chamber, and A, B, C, and D are the derived coefficients for a polynomial regression best fit curve to the calibration data.

Another object of the present invention is to provide a means by which the user can carry out in a continuous way a control of the flow rate and accumulated weight of a granulated, powdered or other particulate material as it passes through the zone of measurement in a way that produces an appropriate signal allowing the calculation of flow rate and/or accumulated weight of material passed as well as offering the possibility of providing a signal that may subsequently be employed in the control of one or more related processes such as process feed, valves, motors, etc. The fact that the user can pass materials as diverse as grains, seeds, pellets, powders, etc., in a continuous way makes much more efficient diverse processes such as loading, transport, transfer, packaging, and the like. In addition, the present invention provides the ability to measure and control flow rates and accumulated weights of materials in fixed lines of transport, in dosing operations, for fiscal control operations, and in situations requiring portable operation all with a simple, easy to use apparatus.

The apparatus of the invention has a measuring chamber having a body comprising a flow tube or conduit having a rectangular, circular, elliptical, or other cross section through which the Solid material to be measured is directed. Within the measuring chamber is located a movable element with a fixed axis of rotation on which the passing solid material exercises a force or torque proportional to the mass flow rate of the solid material and acting against a constant restoring force applied to the axis or the movable lever device, said restoring force being such that the degree of rotational or linear movement imparted by the passing solid will be a function of the force imparted by the solid material due to gravitational forces in free fall or to momentum imparted to said process material by some mechanical means of material transport.

Attached to the axis of the movable lever assembly or to some other convenient part of said assembly is a digital or analog device that measures the angle of rotation of said movable element or some proportional value of the linear movement of said assembly. The raw signal from the digital or analog measuring device is passed to an appropriate electronic circuit that conditions the raw signal in a manner such that a properly programmed associated microprocessor, computer, programmable logic controller (plc) or other similar device receiving said signal converts said signal to an instantaneous flow rate based on a preprogrammed calibration function or table. An additional step in the program then employs an internal clock or other suitable device or method and the previously calculated instantaneous flow rate for calculating the accumulated weight of material having passed through the measuring chamber during the measuring process. If so desired, the raw signal and/or calculated flow rate or accumulated weight can be employed as a feedback signal for the control of appropriate valves, motors or other control devices as are well known in the art.

A particularly important embodiment of the invention is its applicability as a portable device for measuring and controlling the amount of solid material being extracted from or loaded into tanks, trucks, rail cars, ships or other containers or transport systems in a continuous manner, providing important information related to the rate of material transfer, partial weights of material transferred, and final total weights transferred from or to the point of interest to the user. In particular, an important embodiment of the present invention is its application in mobile field operations such as, for example, the loading of seeds, grains, or other bulk materials into trucks, rail cars, silos, etc., at the time of harvest, storage, or production.

A second important embodiment of the invention is its use in fixed process lines for which its compact design and potential for structural modification and custom design make it a particularly attractive alternative to similar products known in the art.

The invention described is notable for its ease of use and flexibility of installation, requiring no more than correct leveling and a simple in-place calibration process. Other factors related to the installation of the invention vary according to the place and form of use.

DETAILED DESCRIPTION OF THE INVENTION

Figure 1:
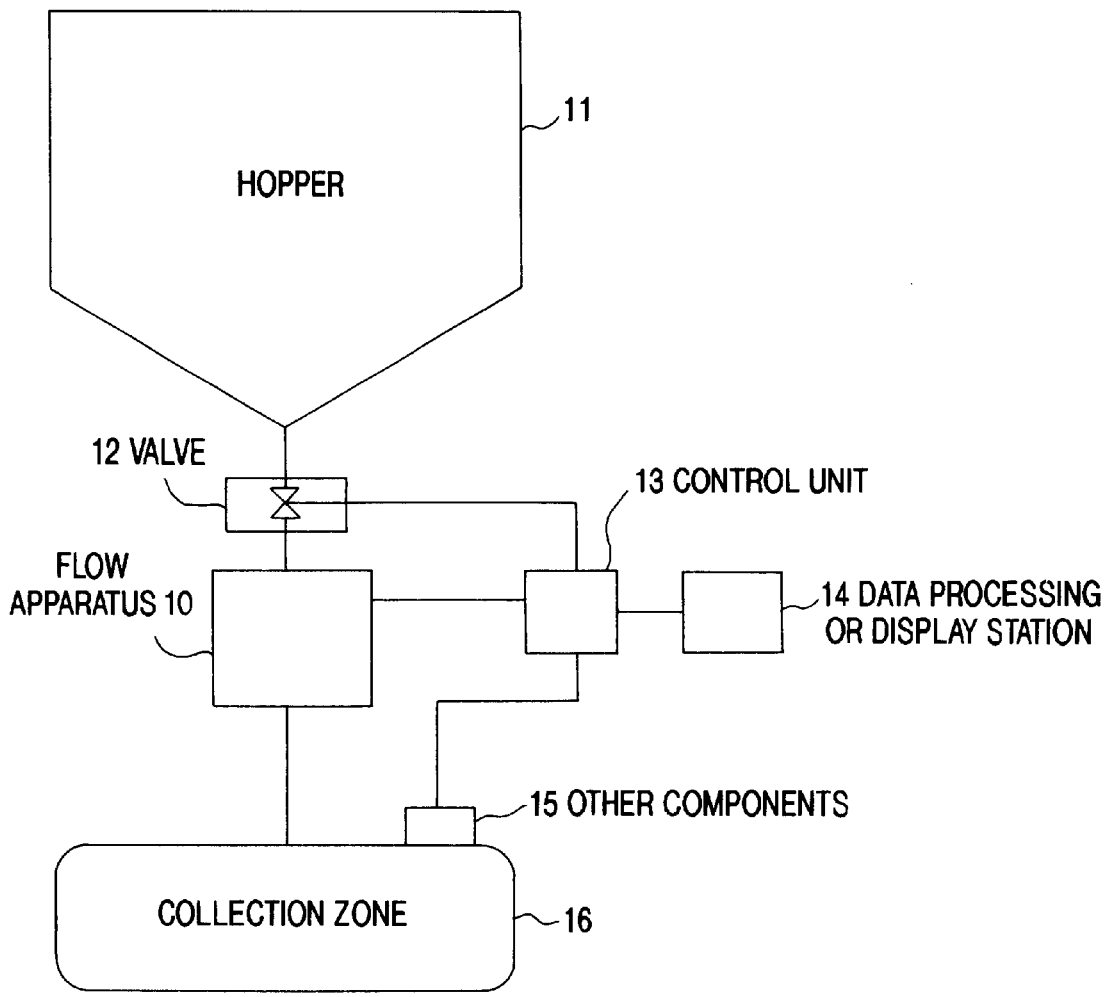
FIG. 1 shows a schematic representation of one embodiment (fixed installation) of a mass flow apparatus in accordance with the present invention.

A clear understanding of the principles and objectives of the present invention will become clear by reference to the attached figures. FIG. 1 illustrates one preferred embodiment of the present invention in which the process flow apparatus 10 is installed in a fixed line of production in which the process material to be measured or controlled passes from a storage or feed hopper 11 to a downstream collection zone 16 by flowing through one or more valves, control, or transport mechanisms 12 into said flow apparatus 10, passing through the measuring chamber and producing the raw signal that is sent to the control unit 13 where the raw signal is converted to a mass flow rate by the preprogrammed calibration function, after which the calculated flow rate and or accumulated weight of process material passed is displayed, or the relevant data sent to an attached data processing or display station 14 (for example, a data recorder, a data transmitter, a central data processing station, etc.). If so desired, the calculated flow rate or accumulated weight may be used, employing electronic means well known in the art, for the control of associated flow rate responsive elements such as valves 12, or other components 15 such as motors, actuators, control units, etc, for controlling the overall process.

Figure 2:
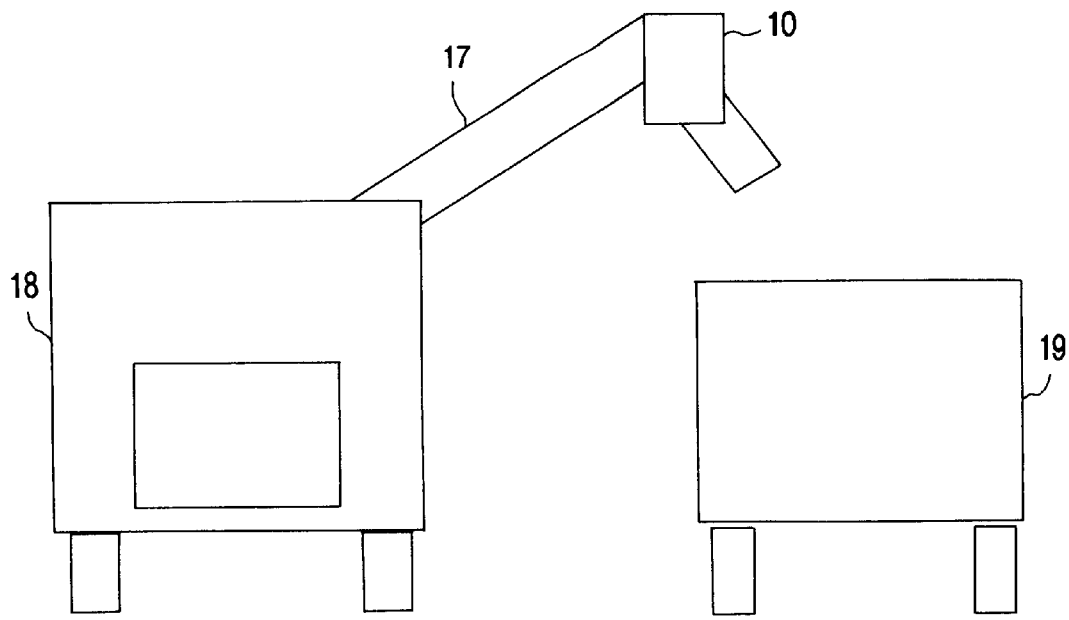
FIG. 2 shows a schematic representation of a second embodiment (mobile installation) of a mass flow apparatus in accordance with the present invention;.

In a second preferred embodiment, the apparatus of the present invention may be employed in a mobile process operation such as that shown schematically in FIG. 2 in which the flow apparatus 10 subject of the present invention is located in series with a process material transport system, such as, for example, a screw auger 17 used in the transport of seed or grain from a harvester 18 to a transport 19 such as a truck, rail car, cargo ship, etc.

The two embodiments of the present invention illustrated in FIGS. 1 and 2 constitute examples of use and should not be construed in any way as limiting its application. Other applications of the present invention will be obvious to those skilled in the art once the principles of operation as described below are clearly understood.

The function of the present invention is based on the following physical principle: as the granulated or powdered material enters the measuring zone or chamber it exerts a force on a movable element that varies its position in response to the force applied to it by the flowing material. Said positional variation may be represented as a change in the angle of the movable element relative to a fixed axis position, the change in the linear distance between a fixed point and a point on the movable element, or some similar measurable modification of position, so long as such change can be quantitatively related to the flow rate of material causing the positional change through the application of a calibration function.

Figure 3:
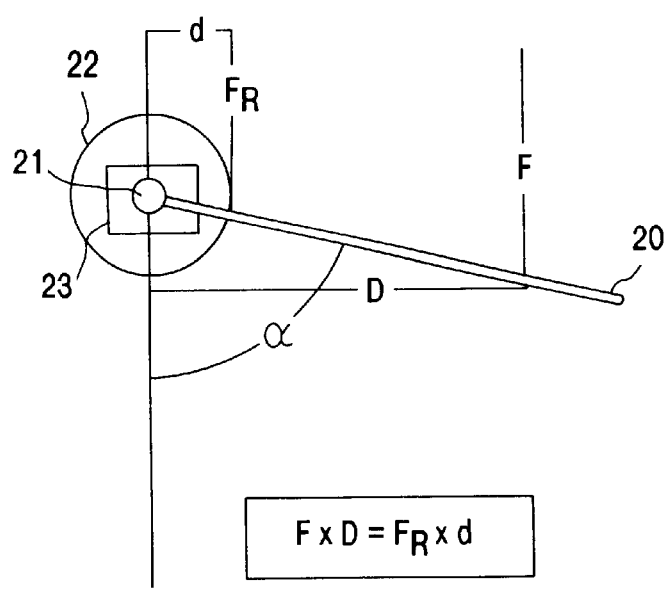
FIG. 3 shows a force diagram of the various force couples and torques involved in the function of the present invention.

A schematic representation of the forces acting on the movable element according to one embodiment of the invention is given in FIG. 3, where the movable element 20 is attached to an axis of rotation 21 to which is attached a sensor 22 that detects the movement of said movable element and emits a raw signal that is proportional to the degree of rotation of the movable element under the action of the flowing material, or, as an alternative, the linear distance of said movement relative to some fixed point of reference. In the case that the flow rate is variable, the movable element must respond and vary its position in direct and rapid response to such a change in flow so that the device includes an element or mechanism 23 attached to the movable element or its axis of rotation that will apply a restoring force causing the movable element to return toward its original position as the force of the flowing material is decreased or to its "zero" point in the absence of an incident force.

The force, F, exerted by the passing process material is given by $$F = m \times a$$

where, m is the mass of the process material traversing the measuring chamber and a is the acceleration of said process material at the moment of contact with the movable element of the present invention. In the case of material in free fall, the acceleration, a, will be equal to the acceleration due to gravity or some component of said acceleration, depending on the exact configuration of the process material inlet and the movable element. The material passing through the apparatus will exercise a force, F, on the movable element, such force producing a moment with respect to the rotational axis of the movable element in such a way that the angle subtended by the movable element or, alternatively, its radial or linear distance of movement with respect to a fixed point of reference, will vary directly with F. At the same time that the force, F, is acting on the movable element, the element or elements fixed to or communicated with the movable element or its axis of rotation will exercise a restoring force, $F_R$, in the opposite direction or sense of rotation.

Given that D is the distance between the effective average point of contact of the passing material with the movable element at which the incident force is applied and its axis of rotation, d is the distance between the effective point of application of the restoring force, $F_R$, and the axis of rotation of the mobile element, and α is the angle of rotation of the mobile element produced by the force applied by the passing material it is obvious that at a given equilibrium position $$F \times D = F_R \times d$$

where (F×D) is the force couple or torque produced by the passing process material on the movable element and ($F_R$×d) is the restoring force exercised by the element or elements of restitution acting on the movable element. Any variation in F will produce a proportional variation in the force couple (F×D) resulting in a new equilibrium position of the movable element. Since the angle of rotation of the mobile element, α, or the radial or linear movement relative to some fixed point will be proportional to force F, and given that F will be proportional to the instantaneous flow rate of the passing material, it is clear that by measuring the angle of rotation of the movable element α, or its radial or linear distance of movement relative to some fixed point, it is possible, subject to the development of the necessary calibration function, to calculate the instantaneous rate of flow for the material passing through the apparatus of the present invention and, by appropriate mathematical means well known in the art, the accumulated weight of material passed over a selected period of time.

Figure 4A:
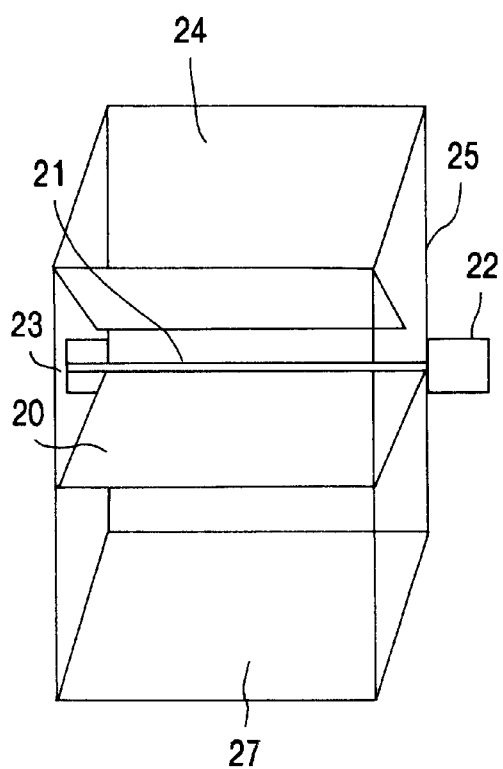
FIGS. 4A and B show schematic front and side views of the basic construction of one embodiment of the mass flow apparatus.
Figure 4B:
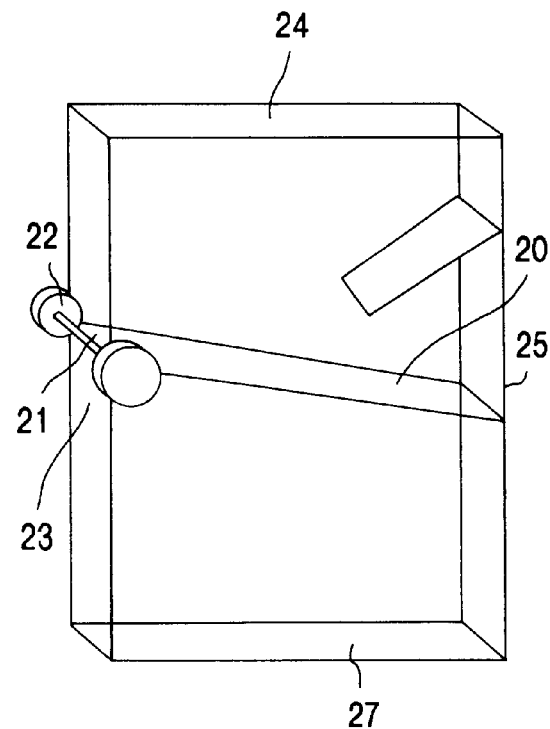

The basic elements of construction of a preferred embodiment of the present invention are shown schematically in FIGS. 4A and B. The preferred embodiment comprises a process material entrance 24 leading to the measuring chamber 25 in which is located the movable element 20 attached to an axis of rotation 21, and a process material exit 27. The sensor 22 producing the raw signal reflecting the displacement of the movable element may be attached directly to the axis of rotation, as illustrated, or may be attached to other convenient points. The sensor 22 may be a digital or analog device that produces a raw signal proportional to the degree of radial or linear movement of the movable element under the influence of sensor would be a digital encoder, although other options will those practiced in the art.

The element or elements providing the restoring force 23 can be, for example, a spring, a counter-weight system, a system of permanent magnets or electromagnets, pneumatic or hydraulic systems, hysterisis clutches or brakes, or similar methods. Alternatively, by the proper configuration of the various elements of the invention it is possible to create the situation in which the weight of the movable element itself supplies the needed restoring force. Typical, but not limiting, examples of restoration mechanisms are illustrated in FIG. 5A–E.

Figure 5A:
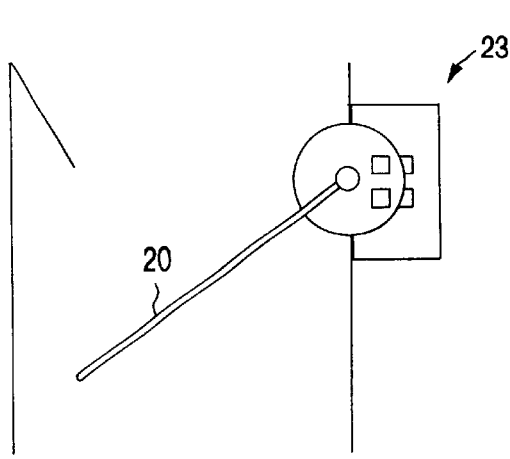
FIGS. 5A–E show schematic representations of several preferred mechanisms for producing restitution of the movable lever assembly.
Figure 5A:
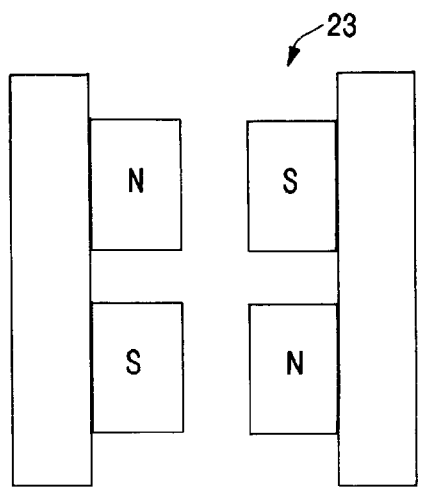
Figure 5B:
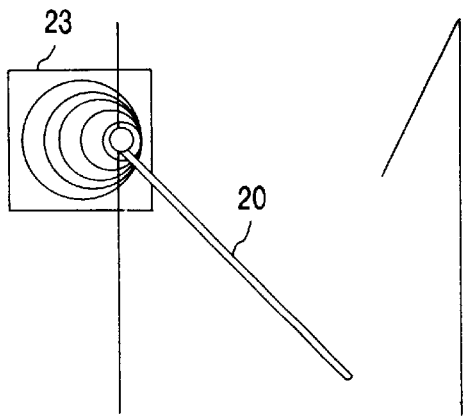
Figure 5C:
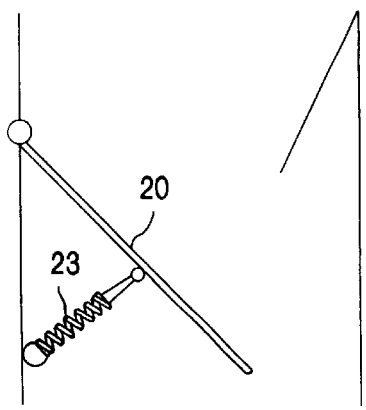
Figure 5D:
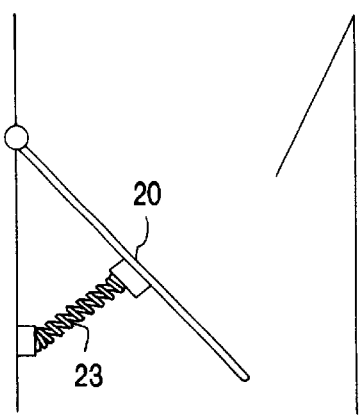
Figure 5E:
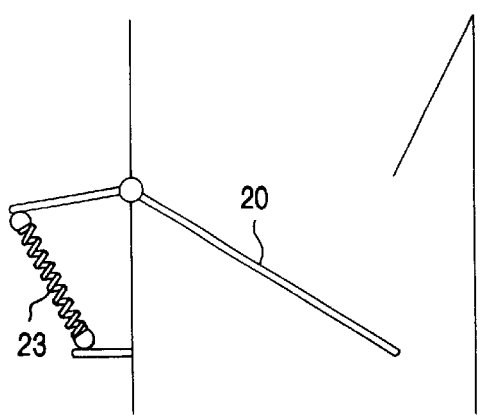

FIGS. 5A and 5AA show an embodiment wherein a magnetic arrangement acts as restoring force element 23 for generating an opposing force to return member 20 to a rest position.

FIGS. 5B–E show further alternatives for element 23 which are believed to be clear from the illustrations. Of course, numerous other configurations are available.

By periodically (for example, each millisecond, each second. etc.) sampling the raw signal, for example, the angle or position of the movable element, and processing the position signal based on a programmed calibration function in a connected controller, computer, PLC, or other suitable element equipped with the appropriate software, the user can obtain a readout of the instantaneous flow rate and, if desired, the accumulated weight of material having passed through the measuring zone in a given lapsed time.

Figure 6:
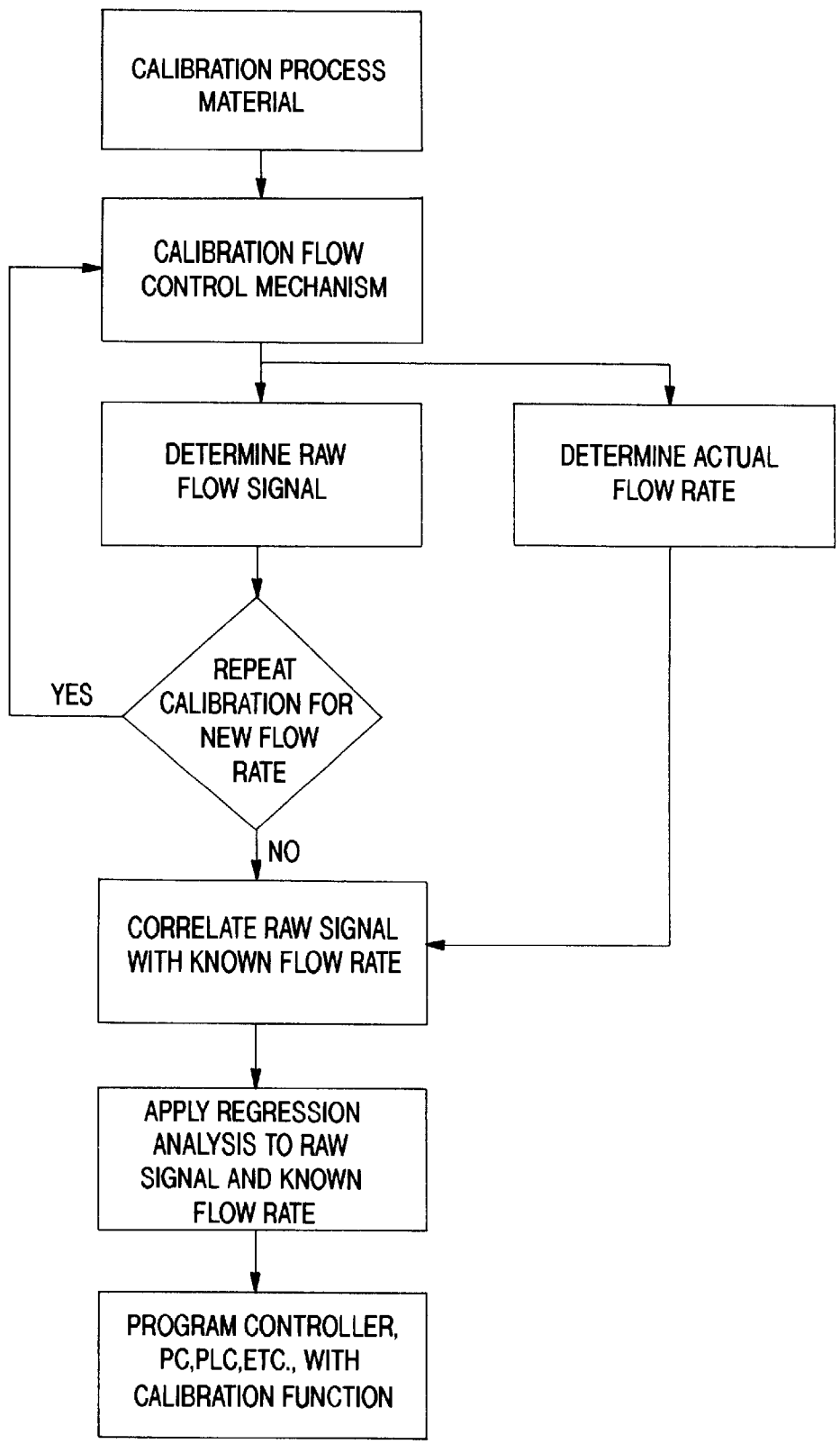
FIG. 6 shows a flow chart illustrating the process of creating a calibration function for the mass flow apparatus of the present invention using a standard calibration material.

In order to convert the raw position signal provided by the sensor element 22, it is necessary to employ the calibration method provided by the present invention. Said method is illustrated schematically in FIG. 6 and FIG. 7. As illustrated in FIG. 6, the method provided comprises the acts of providing one or more calibration materials which may or may not be the same as the process material, and providing a mass flow apparatus similar to the process mass flow apparatus which is used for calibration purposes. Alternatively, the method may be employed with the actual apparatus to be used in the process.

The calibration mass flow apparatus is calibrated using the calibration material or materials by allowing said calibration material or materials to flow through the calibration mass flow apparatus at various known mass flow rates, recording or registering the value of the raw signal output of the sensor at each known flow rate, correlating the raw output signal with the corresponding known flow rate, and subsequently deriving a flow rate conversion function by application of mathematical regression analysis using procedures or computer programs well known in the art. The conversion function may be a linear, quadratic, or cubic polynomial function or other mathematical function suitable for the specific application. Included in the conversion function is a multiplication factor or final calibration factor, K, that allows the user to fine-tune or finalize the calibration function to adjust for any small differences in the characteristics between the process mass flow meter and the calibration mass flow meter, or for small differences in the characteristics of the process material relative to the calibration material.

Figure 7:
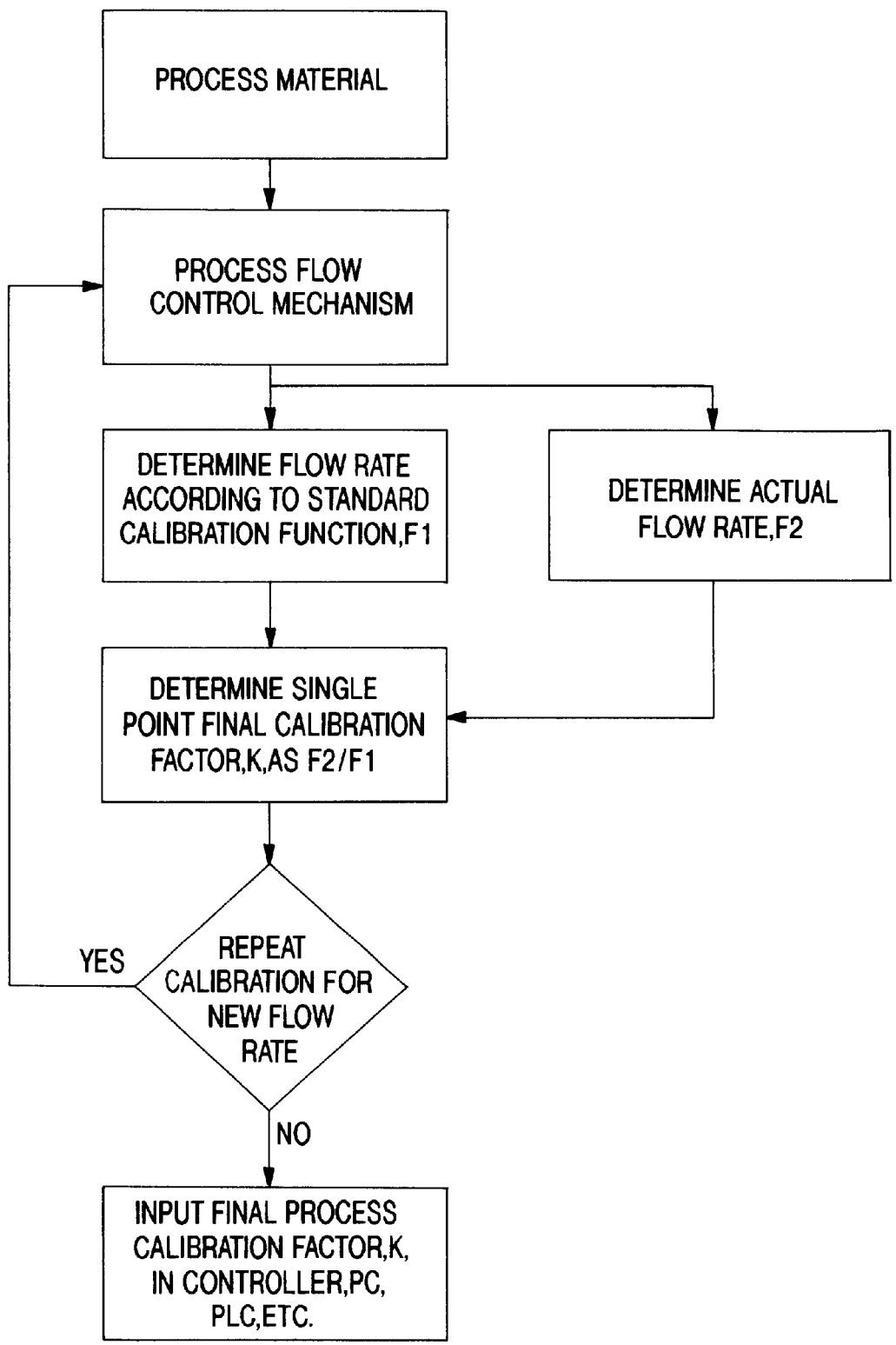
FIG. 7 shows a flow chart illustrating the process of determining the final process calibration factor, K, using the actual process material.

An illustrative diagram for the determination of the final calibration factor, K, is given in FIG. 7. After the calibration function is determined it is programmed into the control unit of the process mass flow meter. Once the process mass flow meter is installed in its final position, a final calibration is carried out by passing process material through the mass flow apparatus at a known flow rate. The ratio between the known flow rate of process material F2, and that indicated by the preliminary calibration, F1, K (K=F2/F1), is then employed as the final calibration factor which is entered into the control unit program by the user to complete the calibration process.

A typical calibration function for a preferred embodiment of the present invention would be of the form $$Q=K*[(A*S^3)+(B*S^2)+(C*S)+D]$$

where Q is the flow rate of process or calibration material passing through the measuring chamber at the instant of signal conversion, K is the previously defined final process calibration factor, S is the value of the raw signal produced by the material flow passing through the measuring chamber, and A, B, C, and D are the derived coefficients for a polynomial regression best fit curve to the calibration data. The units of flow (kilograms/sec, pounds/minute, tons/hour, etc.) calculated by the calibration function can be determined at the time of calibration or several options can be provided by the use of standard conversion factors programmed in the controlling unit selectable by the user.

If, at the time of final calibration, the known flow rate of process material, F2, is greater than the calculated flow rate, F1, given by the original calibration (with K=1 as default), then the value of K will be greater than 1 and insertion in the calibration function will increase the calculated value of Q. If F2<F1, then K will be <1 and the calculated value of Q will be decreased.

Another object of the present invention is to provide a means by which the user can carry out in a continuous way a control of the flow rate and accumulated weight of a granulated, powdered or other particulate material as it passes through the measurement chamber in a way that produces an appropriate signal allowing the calculation of flow rate and/or accumulated weight of material passed as well as offering the possibility of providing a signal that may subsequently be employed in the control of one or more related processes such as process feed pumps, valves, motors, alarms, etc. The fact that the user can pass materials as diverse as grains, seeds, pellets, powders, etc., in a continuous way makes much more efficient diverse processes such as loading, transport, transfer, packaging, and the like. In addition, the present invention provides the ability to measure and control flow rates and accumulated weights of materials in fixed lines of transport, in dosing operations, for fiscal control operations, and in situations requiring portable operation all with a simple, easy to use apparatus.

The above description of several preferred embodiments of the present invention are offered as examples and do not in any way constitute limitations. Many variations to the embodiments and methods disclosed herein may become apparent to those skilled in the art.

What is claimed is:

1. A mass flow apparatus for measuring the mass flow rate of a particulate material, comprising:
   a) a measuring chamber containing a movable element pivotably fixed to an axis of rotation and having an inlet and an outlet, said movable element being pivotable between a rest position, a displaced position and at least one additional position therebetween;
   b) means associated with said movable element for exerting a restoring force on said movable member to bias said movable element toward said rest position;
   c) a sensor for determining at least one quantity of position, movement and distance of movement of the movable element corresponding to said rest position, said displaced position and said at least one additional position; and for generating a raw signal related to said at least one quantity; and
   d) a controller for receiving the raw signal and programmed with a calibration function for determining a corrected material flow rate from said raw signal.

2. The apparatus of claim 1, further comprising at least one flow rate responsive element associated with said apparatus, and at least one control member for controlling said at least one flow rate responsive element, said controller being operatively associated with said at least one control member so as to control said at least one flow responsive element responsive to said material flow rate.

3. The, apparatus of claim 2, wherein said at least one flow rate responsive element is selected from the group consisting of pumps, motors, valves, alarms and combinations thereof.

4. A method of calibrating an apparatus for determining an unknown mass flow rate of a process material flowing through a mass flow apparatus, comprising the steps of:
   a) providing a mass flow apparatus for generating raw output signals proportional to mass flow rate of material passing through the mass flow apparatus;
   b) providing a calibration material;
   c) flowing the calibration material through the mass flow apparatus at various known flow rates:
   d) determining a raw output signal corresponding to each of the various known flow rates;
   e) performing a regression analysis on the corresponding raw output signal and the various known flow rates to determine a calibration function;
   f) programming the calibration function into a controller for the mass flow apparatus;
   g) flowing the process material through the mass flow apparatus at a known process material flow rate;
   h) determining a calculated process material flow rate using the calibration function;
   i) determining a ratio of the known process material flow rate to the calculated process material flow rate; and
   j) inputting the ratio into the controller as a final calibration factor.

5. A method for measuring the mass flow rate of a particulate material, comprising the steps of:
   providing a flow apparatus for generating raw output signals corresponding to mass flow rates of a process material through said apparatus, said flow apparatus having a measuring chamber containing a movable element pivotably fixed to an axis of rotation and having an inlet and an outlet said movable element being pivotable between a rest position, a displaced position and at least one additional position therebetween; means associated with said movable element for exerting a restoring force on said movable member to bias said movable element toward said rest position; a sensor for determining at least one quantity of position, movement and distance of movement of the movable element corresponding to said rest position, said displaced position and said at least one additional position; and for generating said raw output signals related to said at least one quantity; and a control unit, said control unit being programmed with calibration information for determining process material flow rates from said raw output signals;

flowing said process material through said apparatus so as to provide a raw output signal; and determining an actual process material flow rate from said raw output signal using said calibration information.

6. The method of claim 5, wherein said calibration information includes a calibration function derived using a calibration material and a final calibration factor derived using said process material.

* * * * *